US008414163B2

(12) United States Patent
Hashimoto et al.

(10) Patent No.: US 8,414,163 B2
(45) Date of Patent: Apr. 9, 2013

(54) LIGHT SOURCE APPARATUS

(75) Inventors: Naotaka Hashimoto, Osaka (JP); Shinya Kawagoe, Osaka (JP); Toshikazu Endo, Osaka (JP); Kuninori Takezawa, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/391,605

(22) PCT Filed: Jul. 8, 2011

(86) PCT No.: PCT/JP2011/003946

§ 371 (c)(1), (2), (4) Date: Feb. 21, 2012

(87) PCT Pub. No.: WO2012/098594

PCT Pub. Date: Jul. 26, 2012

(65) Prior Publication Data

US 2012/0327669 A1 Dec. 27, 2012

(30) Foreign Application Priority Data

Jan. 18, 2011 (JP) ................................ 2011-007462

(51) Int. Cl.
*B60Q 1/00* (2006.01)

(52) U.S. Cl. ......................... 362/368; 362/374; 362/375

(58) Field of Classification Search .................. 362/368, 362/374, 375

See application file for complete search history.

(56) References Cited

U.S. PATENT DOCUMENTS

| | | | | |
|---|---|---|---|---|
| 2007/0064450 | A1 | 3/2007 | Chiba et al. | |
| 2009/0175037 | A1 * | 7/2009 | Ewert | 362/240 |
| 2009/0180287 | A1 | 7/2009 | Tang | |
| 2010/0315823 | A1 * | 12/2010 | Lin et al. | 362/368 |
| 2010/0328960 | A1 * | 12/2010 | Wang | 362/373 |
| 2011/0261572 | A1 * | 10/2011 | Watanabe et al. | 362/373 |

FOREIGN PATENT DOCUMENTS

| | | |
|---|---|---|
| JP | 07-202272 | 8/1995 |
| JP | 2001-126568 | 5/2001 |
| JP | 2005-011729 | 1/2005 |
| JP | 2008-075887 | 4/2008 |
| JP | 2009-093926 | 4/2009 |
| JP | 3152156 | 7/2009 |
| JP | 2010-073650 | 4/2010 |

* cited by examiner

*Primary Examiner* — Evan Dzierzynski

(57) ABSTRACT

Light source apparatus whose front cover can be removed easily and which can be attached to socket easily even if the base is screw-in type. The light source apparatus includes: cylindrical body 10 having opening 11; light-emitting module 20 housed in body 10; and front cover 40 attached to opening-side end of body 10. Ring-like flange 14 is provided at opening-side end 10*a* of body 10. A plurality of claws 44 are provided at circumferential edge 43 of front cover 40. Front cover 40 is fitted to opening-side end 10*a* of body 10 such that flange 14 is covered by circumferential edge 43 of front cover 40. Flange 14 is provided with at least one stopper face 15*a* which, when it is in contact with at least one claw 44, restricts front cover 40 from rotating around cylindrical axis J of body 10.

11 Claims, 9 Drawing Sheets

LIGHT SOURCE APPARATUS

TECHNICAL FIELD

The present invention relates to a light source apparatus for which a light-emitting module such as an LED (Light-Emitting Diode) module is used as the light source.

BACKGROUND ART

Conventionally, light source apparatuses using LED modules as the light sources have been used as substitutes for halogen bulbs or incandescent bulbs.

As one example of such light source apparatuses, Patent Literature 1 discloses an LED lamp 800 provided with a base 801 of a screw-in type shown in FIG. 8. An LED module 802 of the LED lamp 800 is housed in a cylindrical body 803, and an opening at the front side of the body 803 is closed by a front cover 804. The front cover 804 is attached to the body 803 by causing a plurality of claws 805 provided in the front cover 804 to engage with engaging grooves 806 provided in an inner face of the body 803.

However, with the above engaging structure of the LED lamp 800, the claws 805 hide behind the body 803, and it becomes difficult for the claws 805 to be removed from the engaging grooves 806 when the LED lamp 800 needs to be disassembled for recycling, for example. Thus, it is difficult for the front cover 804 to be removed from the body 803.

In view of this, a light source apparatus 900 shown in FIG. 9 has been proposed. In the light source apparatus 900, a ring-like flange 903 is provided at an opening-side end of a body 902, which is in the shape of a bowl and houses a light-emitting module 901, and a plurality of claws 905 are provided at the circumferential edge of a front cover 904. The front cover 904 is attached to the body 902 by fitting the front cover 904 to the opening-side end of the body 902 and causing the plurality of claws 905 to grasp the flange 903 in a plurality of directions from the outside to engage with the flange 903.

With the above engaging structure of the light source apparatus 900, the claws 905 are outside the body 902, and the claws 905 can be removed easily from the flange 903 when the LED lamp 900 is disassembled, and thus the front cover 904 can be removed easily from the body 902.

[Citation List]

[Patent Literature]

[Patent Literature 1]

Japanese Patent Application Publication No. 2009-093926

SUMMARY OF INVENTION

Technical Problem

However, the engaging structure of the light source apparatus 900 is difficult to be adopted in a light source apparatus provided with a base of a screw-in type. The reason is as follows. When a light source apparatus provided with a screw-in base is attached to a lighting equipment, the front cover, which is easy to grasp, is grasped by hand and the LED lamp is turned around so that the base is screwed into the socket and the LED lamp is attached to the lighting equipment. However, with the engaging structure where the flange is grasped by a plurality of claws in a plurality of directions from outside, the front cover wastefully rotates relative to the body, and the rotational force applied to the front cover is difficult to be conveyed to the base. Thus the base is difficult to be screwed into the socket, and the light source apparatus is difficult to be attached to the socket.

It is therefore an object of the present invention to provide a light source apparatus whose front cover can be removed easily and which can be attached to a socket easily even if the base of the light source apparatus is a screw-in type.

Solution to Problem

The above-described object is fulfilled by a light source apparatus comprising: a cylindrical body having an opening; a light-emitting module housed in the body; and a front cover attached to an opening-side end of the body, a ring-like flange being provided at the opening-side end of the body, a plurality of claws being provided at a circumferential edge of the front cover, the front cover having been fitted to the opening-side end of the body, with the flange being covered by the circumferential edge of the front cover, and at least one stopper face having been formed in the flange such that at least one of the claws being in contact with the at least one stopper face restricts the front cover from rotating around a cylindrical axis of the body.

Advantageous Effects of Invention

In the above-described structure, at least one stopper face has been formed in the flange such that at least one of the claws being in contact with the at least one stopper face restricts the front cover from rotating around a cylindrical axis of the body. With this structure, when the front cover is grasped by hand and turned around, at least one claw becomes in contact with the at least one stopper face, and the front cover is restricted from rotating. This prevents the wasteful rotation of the front cover relative to the body and facilitates the attachment of the light source apparatus to a socket.

DESCRIPTION OF EMBODIMENTS

The following explains an embodiment of the light source apparatus of the present invention with reference to the attached drawings. The elements of the drawings are not necessarily to scale relative to each other. Note also that the ranges of numerical values denoted with use of sign "-" include numerical values at both ends thereof. Note further that, in each drawing, the dashed line indicates lamp axis J, and the direction indicated by arrow X parallel to the lamp axis J is the front direction of the light source apparatus, which is also a lighting direction.

[Embodiment]

(Structure Outline)

Figure 1:
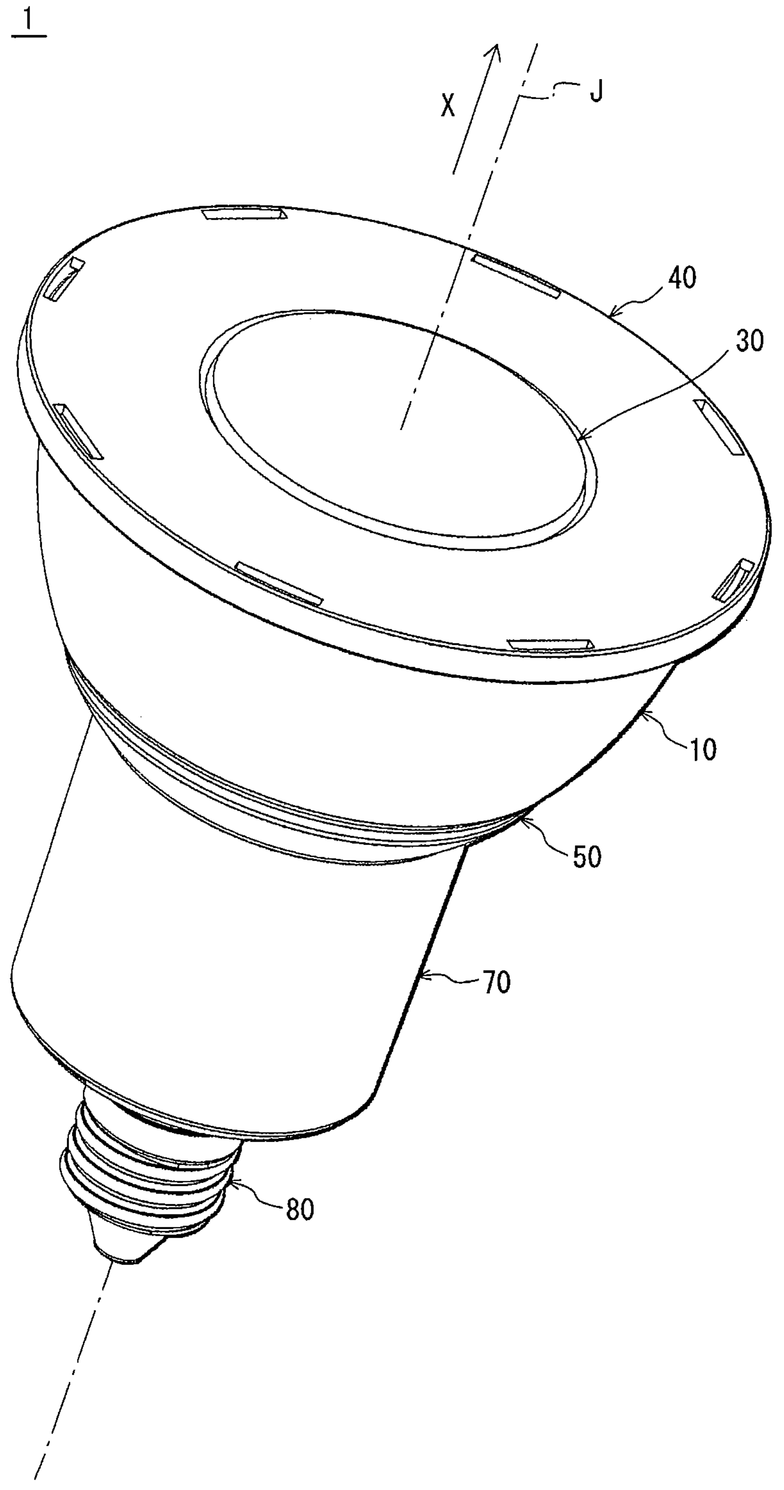
FIG. 1 is a perspective view of the light source apparatus in the present embodiment.
Figure 2:
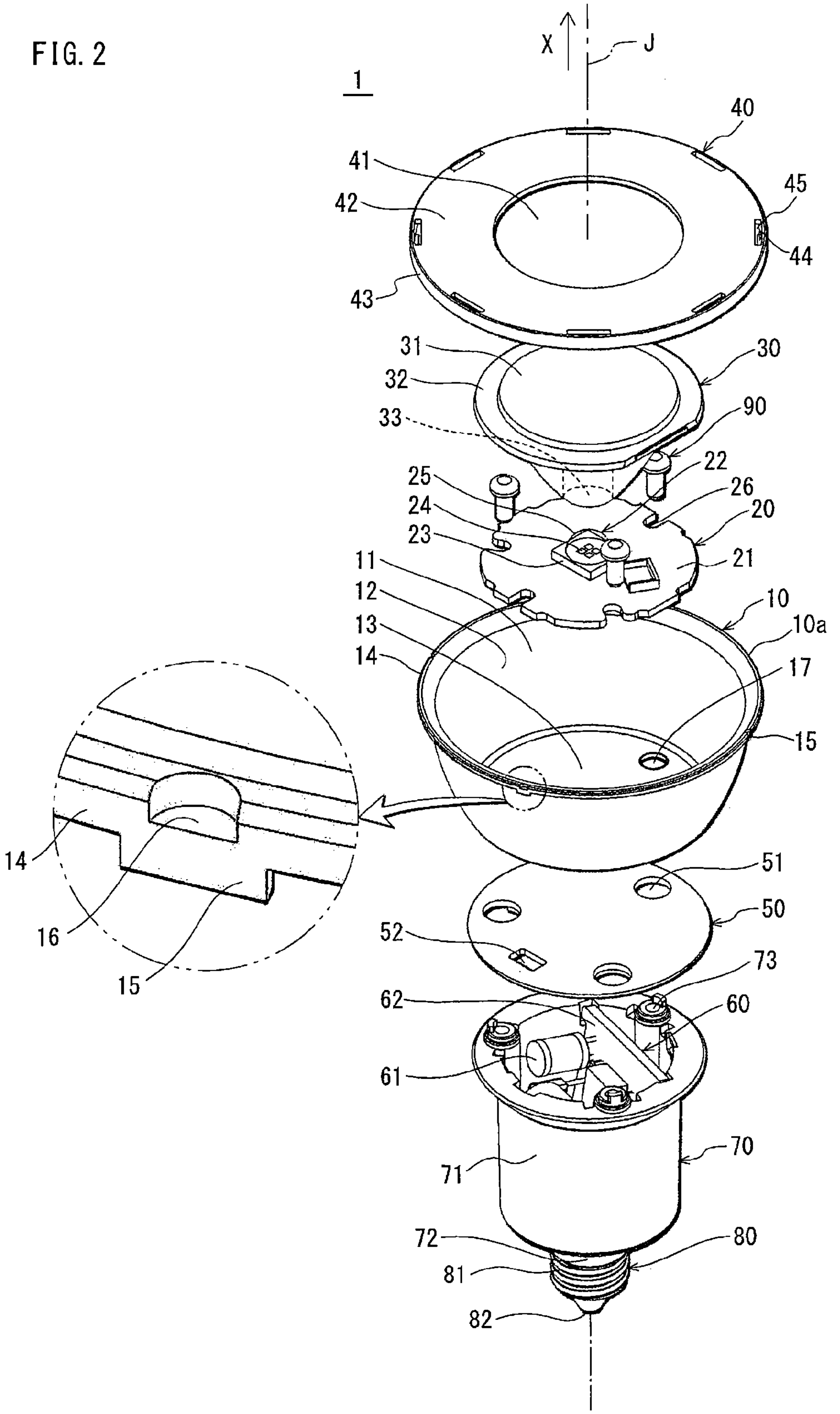
FIG. 2 is an exploded perspective view of the light source apparatus in the present embodiment.

FIG. 1 is a perspective view of the light source apparatus in the present embodiment. FIG. 2 is an exploded perspective view of the light source apparatus in the present embodiment.

As illustrated in FIG. 1, the light source apparatus in the present embodiment is an LED lamp 1 having an outer appearance conforming to the standard for halogen bulb defined in "JIS C 7527", and can be a substitute for a halogen bulb. As illustrated in FIG. 2, the LED lamp 1 includes a body 10, a lighting module 20, an optical member 30, a front cover 40, an insulation member 50, a circuit unit 60, a case 70, and a base 80.

(Body)

Figure 3:
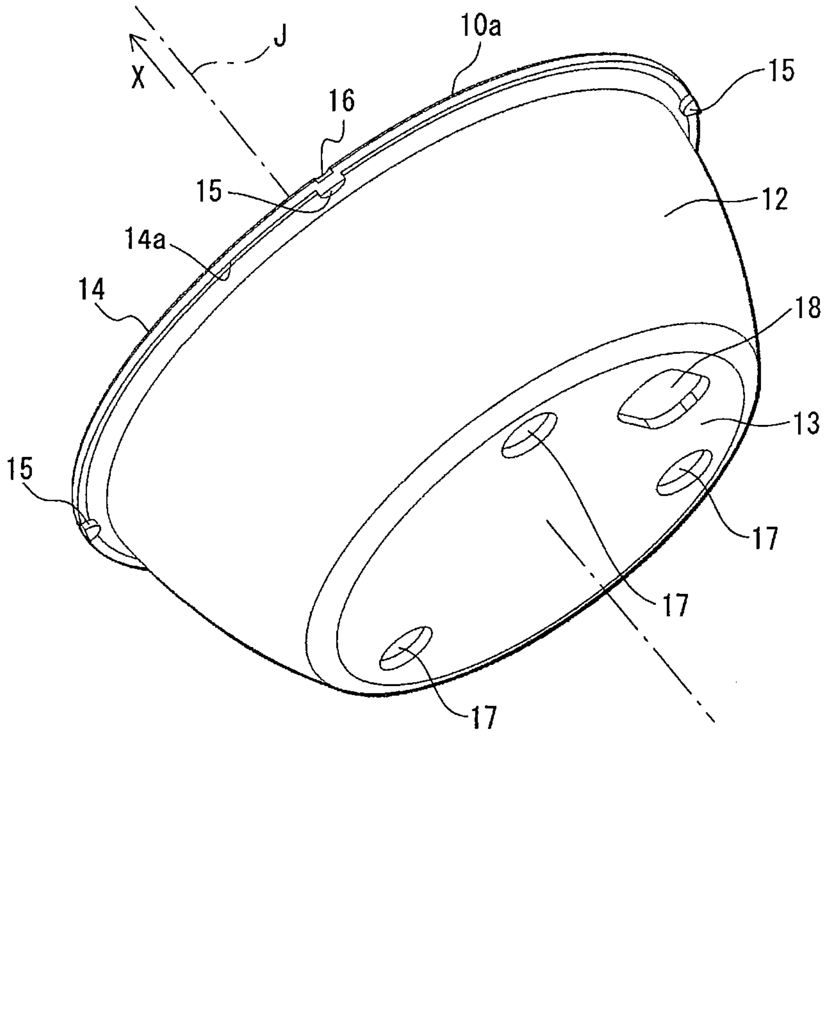
FIG. 3 is a perspective view of the body in the present embodiment.

FIG. 3 is a perspective view of the body in the present embodiment. As shown in FIG. 3, the body 10 is a cylindrical member with a bottom and has an opening 11 on the front side. The body 10 includes a cylindrical portion 12 and a bottom 13, wherein the cylindrical portion 12 is in the shape of an approximate cylinder whose axis is identical with the lamp axis J, and the bottom 13 closes the back side of the cylindrical portion 12. More specifically, the body 10 is in a shape of a bowl with a flat bottom, the diameter of the cylindrical portion 12 gradually expanding from the back toward the front. Note that the shape of the body 10 is not limited to the above one. For example, the body 10 may be a cylinder having openings at both ends at the front side and the back side thereof. Also, the body 10 is not limited to a cylinder, but may be an elliptic cylinder or a rectangular cylinder. Furthermore, the body 10 may be a cylinder with a uniform diameter, or a cylinder in which the diameter reduces gradually from the back toward the front.

The body 10 houses the light-emitting module 20 and the optical member 30. The body 10 is made of a metal, and functions as a heat sink that releases the heat, which is generated by the light-emitting module 20 in the body 10, to outside. The metal used in the body 10 is preferably aluminum, taking account of heat radiation, heat resistance, light weight and the like.

At an opening-side end 10*a* of the cylindrical portion 12, a flange 14, which is in the shape of an approximate ring, is provided so as to encompass the opening 11. An extension width of the flange 14 extending in a direction perpendicular to the lamp axis J is, for example, 1.6±0.15 mm (the preferable range is from 1.0 mm to 3.5 mm). The front cover 40 is fitted and attached to the opening-side end 10*a* of the cylindrical portion 12 by causing claws 44, which are described later, to engage with the flange 14. Details of the attachment structure of the front cover 40 is described later.

Also, in a back face 14*a* of the flange 14, a plurality of projections 15 are provided at intervals along the circumferential direction of the flange. More specifically, four projections 15 are arranged at equal intervals (with each interval having a rotational angle of 90°). Note that the number of the projections 15 is not limited to "4", but may be "1" or any number among "2" or more. It should be noted however that the number of the projections 15 is preferably in the range from "2" to "16" so that the engaging of the claws 44 is not disturbed and the amount of wasteful rotation of the front cover 40 is reduced. Also, the interval between projections 15 may be determined arbitrarily. That is to say, the projections 15 may be arranged at equal intervals or at different intervals. The above structure, when the projections 15 are used to restrict the wasteful rotation of the claws 44, a plurality or all of the projections are in contact at the same time, thus the resistance against the rotation becomes large, and produces a great effect in preventing the wasteful rotation of the cover.

Figure 4A:
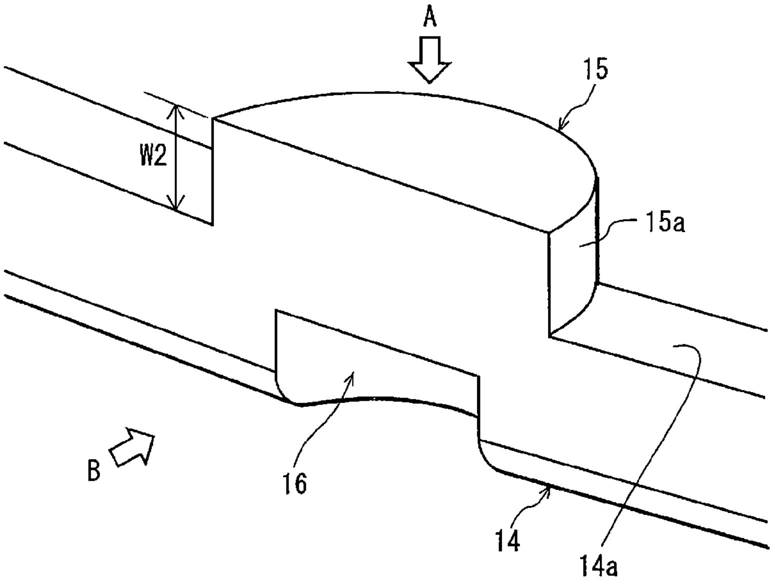
FIGS. 4A to 4C illustrate a projection in the present embodiment.
Figure 4B:
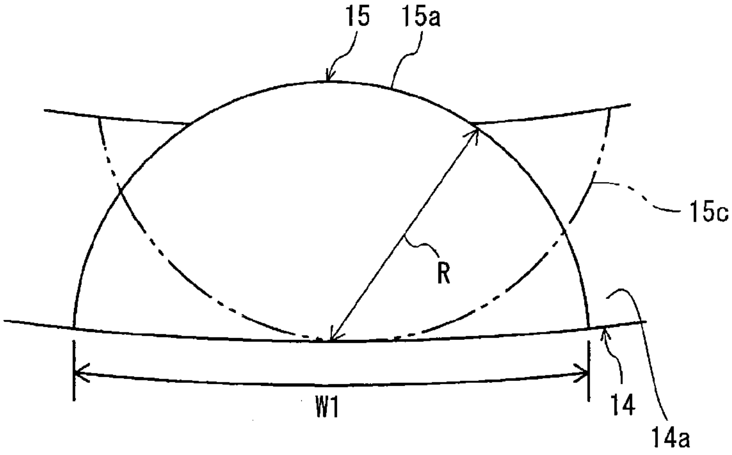
Figure 4C:
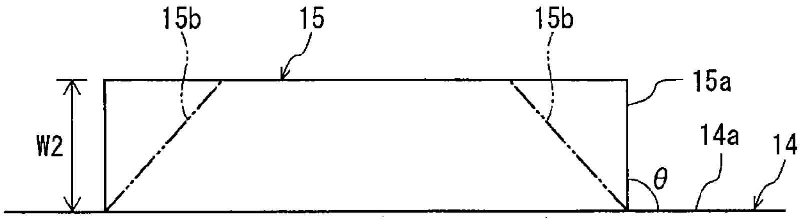

FIGS. 4A through 4C illustrate the projection in the present embodiment.

FIG. 4A is a perspective view of a projection looking from the back thereof. FIG. 4B illustrates the projection looking from the direction of the arrow A shown in FIG. 4A. FIG. 4C illustrates the projection looking from the direction of the arrow B shown in FIG. 4A.

The projection 15 is formed by, for example, hammering out, and a dent 16, which is formed by the hammering out remains in the front surface of the flange 14. Note that the method for forming the projection 15 is not limited to the hammering out, but may be another method such as the press forming.

As shown in FIG. 4A, the projection 15 is approximately in the shape of a semicylinder. More specifically, as shown in FIG. 4B, the shape of the projection 15 looking from the direction of the arrow A shown in FIG. 4A (the shape of the projection 15 when it is looked from the back thereof in a direction parallel to the lamp axis J) is approximately in the shape of a semicylinder. Radius R of the semicircle is, for example, 1±0.05 mm (the preferable range is from 0.5 mm to 3.0 mm); and width W1 along the flange circumferential direction (circumferential direction of the circumferential wall) is 2.0±0.1 mm (the preferable range is from 1.0 mm to 6.0 mm).

Also, as shown in FIG. 4C, the shape of the projection 15 looking from the direction of the arrow B shown in FIG. 4A (the shape of the projection 15 when it is looked from the outside of the flange 14 in a direction parallel to the lamp axis J) is approximately in the shape of a rectangle. The length of a short side of the rectangle, namely, width W2 that is a width of a projection from the back face 14*a* of the flange 14 is, for example, 0.5±0.05 mm (the preferable range is from 0.2 mm to 2.0 mm).

Back to FIG. 4A, the projection 15 has a stopper face 15*a* perpendicular to the back face 14*a* of the flange 14. As shown in FIG. 4B, the stopper face 15*a* is a surface curved approximately in the shape of an arc. The stopper face 15*a* mainly exerts its function at areas corresponding to both ends of the arc of the stopper face 15*a*. When the claws 44 of the front cover 40 bump against the areas, the movement of the claws 44 is restricted.

(Light-Emitting Module)

Back to FIG. 2, the light-emitting module 20 is the light source of the LED lamp 1, and includes a module substrate 21 and an LED unit 22 implemented approximately on the center of the module substrate 21. The light-emitting module 20 is mounted approximately on the center of the bottom 13 inside the body 10. The LED unit 22, for example, includes: a unit substrate 23; an LED chip 24 of the InGaN type emitting blue light; and a semispherical sealing member 25 which contains a phosphor for emitting yellow-green light and seals the LED chip 24. The LED unit 22 converts a part of blue light emitted from the LED chip 24 to yellow-green by the phosphor, and emits white light that is generated as a mixture of blue light and yellow-green light.

(Optical Member)

The optical member 30 is made of, for example, a light-transmissive material such as a transparent acrylic resin, and includes a lens 31 and a circumferential unit 32 that are formed as one unit, wherein the lens 31 is in the shape of an approximate truncated cone whose tip has been cut horizontally, and the circumferential unit 32 is in the shape of an approximate ring-like plate, and provided as an extension from a circumferential surface of the lens 31.

The lens 31 is positioned approximately at the center of the body 10, and on the front side of the light-emitting module 20. The lens unit 31 has a concave 33 having the shape of an approximate cylinder at a back-side end thereof, and by fitting a sealing member 25 of the LED unit 22 into the concave 33, the position of the optical member 30 is determined relative to the LED unit 22.

The light emitted from the light-emitting module 20 enters the lens unit 31 mainly from the concave 33, passes through the lens unit 31, and is extracted to outside of the body 10 via a front surface of the lens unit 31. The light distribution property of the emitted light changes when the light passes through the lens 31. More specifically, focused by the lens unit 31, the emitted light becomes a spotlight similar to the light emitted from a mirrored halogen bulb. Note that the front surface of the lens unit 31 is processed to have a function to diffuse light. For example, the lens unit 31 is provided with a plurality of convexes and concaves for diffusing the emitted light.

The circumferential unit 32 is at the back side of the front cover 40 to close the opening 11 of the body 10, and the front face of the circumferential unit 32 and the back face of the front cover 40 are in face-to-face contact. Since the circumferential unit 32 and the front cover 40 are in face-to-face contact, the heat is likely to transfer from the optical member 30 to the front cover 40. Thus the heat generated in the LED unit 22 can be released, via the optical member 30, from the front cover 40 to outside efficiently.

The front face of the circumferential unit 32 is covered by the front cover 40. This makes the outer appearance of the LED lamp 1 excellent in that the light-emitting module 20 housed in the body 10 is difficult to be seen through from outside. When the front cover 40 is light-transmissive, a small amount of light leaked from the optical member 30 can pass through the front cover 40. This produces an effect of causing the whole front surface of the lamp to gleam.

(Front Cover)

Figure 5A:
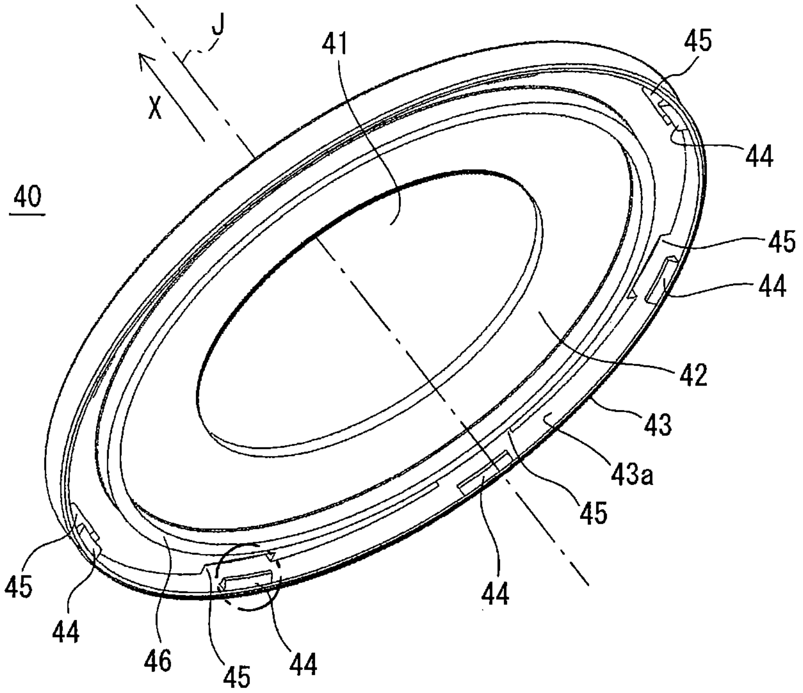
FIGS. 5A and 5B illustrate a front cover in the present embodiment.
Figure 5B:
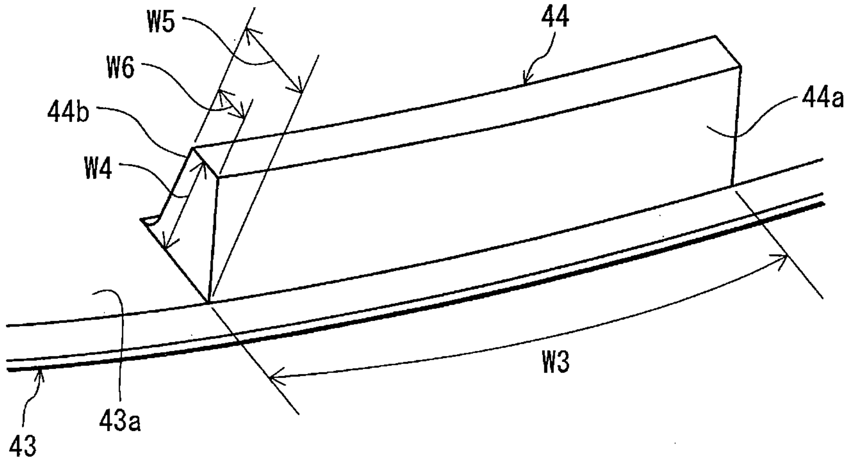

FIGS. 5A and 5B illustrate the front cover in the present embodiment. FIG. 5A is a perspective view of the front cover looking from the back thereof. FIG. 5B is an enlarged view of a portion encircled by a two-dot chain line in FIG. 5A.

As shown in FIG. 5A, the front cover 40 includes: a main body 42 that is in the shape of a ring-like plate and has an approximately circular light emission window 41; and a circumferential wall 43 that is in the shape of a short cylinder extending backward from the outer circumferential edge of the main body 42. Note that the front cover 40 is not limited to the above shape, but may be in any shape that fits the shape of the opening 11 of the body 10.

The front cover 40 is made of a non-light-transmissive resin such as white PBT (polybutylene terephthalate). PBT is preferred as a material of the front cover 40 since it has high heat resistance, moderate elasticity, and high weather resistance. The resin that constitutes the front cover 40 is not limited to PBT, but may be acrylic, PC (polycarbonate) or the like. Also, the front cover 40 is not limited to white, but may be of any color. The front cover 40 may be transparent or translucent.

In the front cover 40, a plurality of claws 44 are provided at the circumferential wall 43 placed at an outer circumferential edge. A flange 14 is provided between the inner surface of the front cover 40 and the claws 44. More specifically, the number of the claws 44 is eight, and the claws 44 are arranged along the circumferential direction of the circumferential wall 43 at equal intervals near the back-side edge of an inner circumferential face 43*a* of the circumferential wall 43. The claws 44 are provided so as to project toward the lamp axis J. The number of the claws 44 is not limited to eight, but is preferably in the range from 3 to 30 so that the front cover 40 can be attached easily and detached with difficulty, and detached relatively easily when the LED lamp 1 is disassembled.

As shown in FIG. 5B, a back face 44*a* of each claw 44 is tapered so that the claws 44 can smoothly go around behind the flange 14. This structure makes it easy for the front cover 40 to be attached to the body 10, and at the same time, makes the claws 44 difficult to break during the attachment. Note that the back face 44*a* of each claw 44 may be formed in a round shape. This shape also provides a similar effect.

On the other hand, a front face 44*b* of each claw 44 is formed to be flat so that, in the state of engaging with the flange 14, the front face 44*b* of each claw 44 can easily be in close contact with the back face 14*a* of the flange 14, the claws 44 being difficult to be disengaged from the flange 14.

Width W3 of each claw 44 extending along the circumferential direction of the circumferential wall 43 is, for example, 4.0±0.1 mm (the preferable range is from 2 mm to 15 mm), and projection width W4, which is a vertical length of the inner face 43*a* of the circumferential wall 43 is, for example, 0.65±0.05 mm (the preferable range is from 0.25 mm to 1.5 mm). Also, with regard to widths of each claw 44 parallel to the lamp axis J, width W5 at the base, which is the broadest, is, for example, in the range from 0.5 mm to 0.6 mm (the preferable range is from 0.3 mm to 1.5 mm), and width W6, which is the narrowest, is, for example, 0.25±0.05 mm (the preferable range of the difference from the width W5 is from 0 mm to 1.2 mm).

In the main body 42, holes 45 are provided at positions corresponding to the claws 44. With the presence of the holes 45, it is possible to form, from resin by molding, the front cover 40 of a complicated shape by using a simple mold constituted from a smaller number of parts. This realizes a simple molding. Also, on the back face of the main body 42, a rib 46 in the shape of an approximate ring is provided. This reinforces the strength of the front cover 40.

The front cover 40, in the state of being attached to the body 10, urges the optical member 30 backward. This causes the front cover 40 and the circumferential unit 32 to be in face-to-face contact, causing the lens unit 31 to be in contact with the light-emitting module 20. This restricts the movement of the optical member 30 in the front and back direction, preventing the positional shift and backlash of the optical member 30. Also, since the front cover 40 and the circumferential unit 32 are in close contact, the heat is allowed to transfer from the optical member 30 to the front cover 40. This improves the heat radiation of the LED lamp 1.

(Insulation Member)

Back to FIG. 2, the insulation member 50 is used to provide electrical insulation between the circuit unit 60 and the body 10, and is made of an insulation material such as resin or ceramic. The insulation member 50 is in the shape of an approximately circular plate, has approximately the same diameter as the bottom 13 of the body 10, and is arranged at the back of the bottom 13.

(Circuit Unit)

The circuit unit 60, for example, includes a lighting circuit that is provided with: a rectifier circuit that rectifies an AC power supplied from a commercial power source to a DC power; and a voltage adjustment circuit that adjusts a voltage value of the DC power rectified by the rectifier circuit. The circuit unit 60 is electrically connected with a shell 81 and an eyelet 82 of the base 80 and with the LED unit 22, receives power via the shell 81 and eyelet 82 from lighting equipment (not illustrated), and causes LED chips 24 of the LED unit 22 to emit light.

The circuit functions of the circuit unit 60 are realized by a plurality of electronic parts 61 which are implemented on a substrate 62.

(Case)

The case 70 is, for example, in the shape of a cylinder, and includes: a large-diameter portion 71 at the front side thereof; and a small-diameter portion 72 extending from the back of the large-diameter portion 71. The case 70 is attached to the back of the body 10 with the insulation member 50 in between. The large-diameter portion 71 houses the circuit unit 60 mainly. The base 80 fits to the outside of the small-diameter portion 72. The case 70 has a function to ensure the insulation of the circuit unit 60, and is made of an insulating material such as a resin or ceramic.

(Base)

The base 80 is a screw-in type, includes the shell 81 and the eyelet 82, and is provided so that the LED lamp 1 attached to a lighting equipment can receive power from a socket (not illustrated). The screw-in base may be an E base such as E10, E11, E12, E14, E17, E26, E27, or E39, or an EZ base or the like.

(Assembly of Light Source Apparatus)

As shown in FIG. 3, the bottom 13 of the body 10 is provided with screw holes 17 for the fixing with screws and a wiring hole 18 for wiring. Also, as shown in FIG. 2, the insulation member 50 is provided with screw holes 51 and a wiring hole 52. Further, the module substrate 21 of the light-emitting module 20 is provided with screw holes 26, and the case 70 is provided with screw holes 73. The body 10, light-emitting module 20, insulation member 50, and case 70 are assembled by inserting three screws 90 through the screw holes 26 of the module substrate 21, the screw holes 17 of the body 10, and the screw holes 51 of the insulation member 50 in the stated order, and in that state, further inserting the screws 90 into the screw holes 73 of the case 70. Also, the wiring (not illustrated) of the light-emitting module 20 is introduced into the case 70 through the wiring hole 18 of the body 10 and the wiring hole 52 of the insulation member 50, and is electrically connected to the circuit unit 60.

(Engaging Structure of Claws and Flange)

Figure 6A:
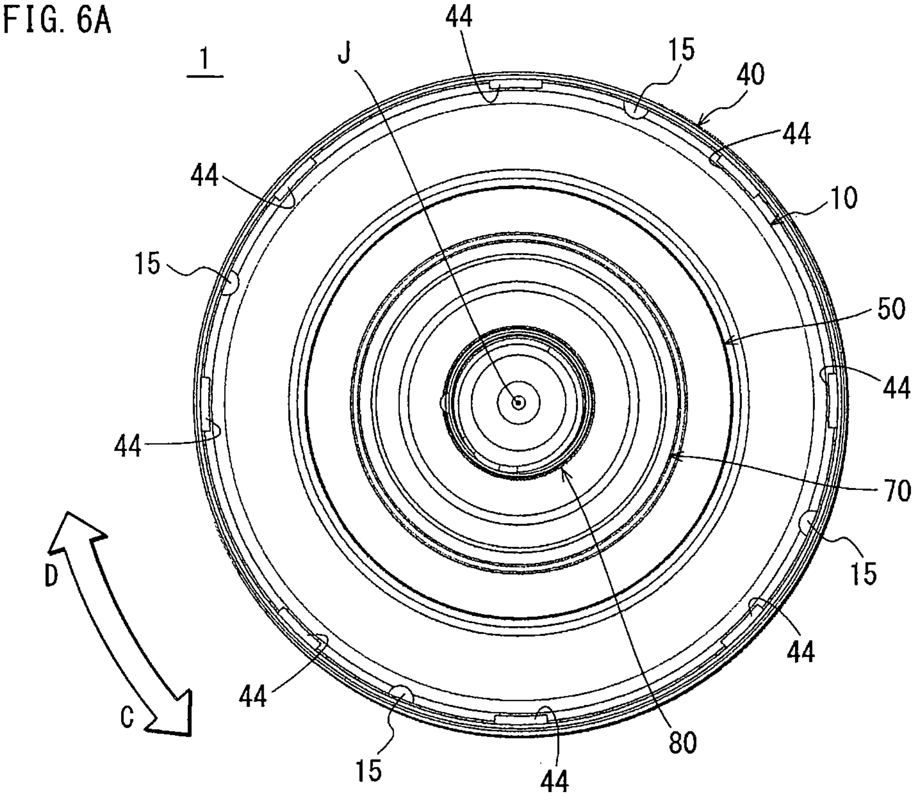
FIGS. 6A and 6B illustrate the state of restriction to the movement of claws of the projection.
Figure 6B:
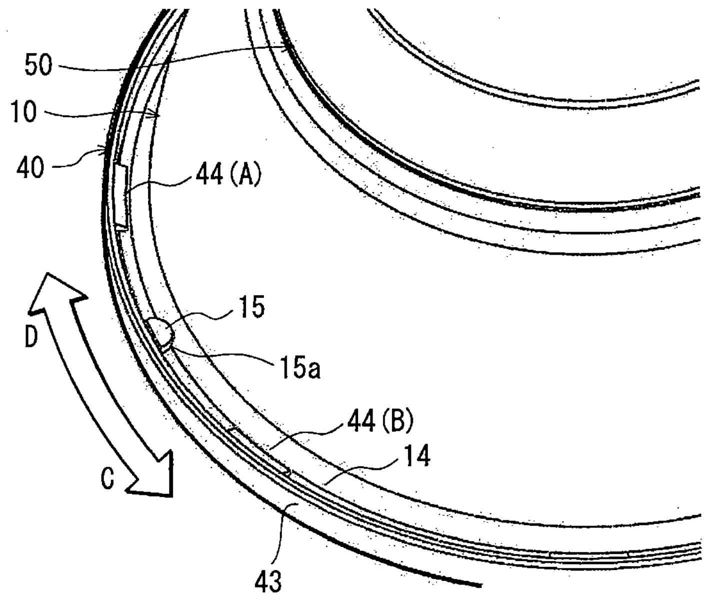

FIGS. 6A and 6B illustrate how the movement of the claws is restricted by the projections. FIG. 6A illustrates the light source apparatus looking from the back. FIG. 6B is a perspective view of an engaging portion. Note that, in FIG. 6B, different alphabets are assigned to signs "44" which are denoting claws, so that the claws 44 can be identified individually.

As shown in FIGS. 6A and 6B, the front cover 40 is fit to an opening-side end 10*a* of the body 10 so as to cover the flange 14 with the circumferential wall 43. Further, the claws 44 engage with the flange 14. The claws 44 go around behind the flange 14, and the flange 14 is sandwiched between the claws 44 and the main body 42. This restricts the movement of the front cover 40 relative to the body 10 in the front and back direction. Also, the circumferential wall 43 encompasses the outer circumference of the flange 14. This restricts the movement of the front cover 40 relative to the body 10 in a direction perpendicular to the lamp axis J.

In the front cover 40, a plurality of claws 44 are arranged at intervals with a space between each pair of adjacent claws. Thus the claws 44 independently engage with the flange 14 of the body 10. With such a structure, even if one of the claws 44 is removed from the flange 14, it does not have an effect to such an extent that any of the other claws 44 is removed as well. Thus the structure makes it difficult for the front cover 40 to be removed from the body 10 by a slight shock. Furthermore, the structure enables the stress, which is applied to the claws 44 when the front cover 40 is attached or detached, to be distributed over all the claws 44. Thus the structure makes the attachment/detachment smooth and the claws 44 difficult to break.

With the presence of a stopper surface 15*a* of a projection 15 of the flange 14, the rotation of the front cover 40 relative to the body 10 around the lamp axis J is restricted. As shown in FIG. 6A, in the state where the front cover 40 is attached to the body 10, the projection 15 is provided at every other space between adjacent claws 44 in the circumferential direction of the circumferential wall 43.

When the LED lamp 1 is attached to the lighting equipment, mainly the circumferential wall 43 of the front cover 40 is grasped by hand and the front cover 40 is turned around in a direction indicated by arrow C in FIGS. 6A and 6B (in a counterclockwise direction around the lamp axis J looking from the back). In this operation of turning around the front cover, when no claw 44 is in contact with any of the projections 15, the front cover 40 wastefully rotates relative to the body 10.

As the front cover 40 turns around in a clockwise direction in the state as shown in FIG. 6B, the claw 44(A) rotates in a direction indicated by the arrow C and comes closer to a projection 15. When the wasteful rotation further proceeds, the claw 44(A) bumps against the projection 15 and the rotation cannot proceed any further. This stops the wasteful rotation of the front cover 40 relative to the body 10, and allows the rotational force applied to the front cover 40 to be conveyed to the body 10. When the body 10 rotates, the base 80 fixed by screws 90 to the body 10 as one unit also rotates, causing the base 80 to be screwed into the socket and the LED lamp 1 to be attached to the lighting equipment.

Conversely, to remove the LED lamp 1 from the lighting equipment, the front cover 40 is turned around in a direction indicated by arrow D in FIGS. 6A and 6B (in a clockwise direction around the lamp axis J looking from the back). In this case too, when no claw 44 is in contact with any of the projections 15 as shown in FIG. 6A, the front cover 40 wastefully rotates relative to the body 10. Starting from the state shown in FIG. 6B, the claw 44(B) rotates in a direction indicated by the arrow D, comes closer to a projection 15, and when the wasteful rotation further proceeds, the claw 44(B) bumps against the projection 15 and the rotation cannot proceed any further. This stops the wasteful rotation of the front cover 40 relative to the body 10, and allows the rotational force applied to the front cover 40 to be conveyed to the body 10, and when the body 10 rotates, the base 80 also rotates, causing the base 80 to be removed from the socket and the LED lamp 1 to be removed from the lighting equipment.

In the present embodiment, as shown in FIG. 4C, angle θ formed between the stopper face 15*a* of the projection 15 and the back face 14*a* of the flange 14 is a right angle. Thus, as indicated by a two-dot chain line in FIG. 4C, compared with the case where angle θ formed between a stopper face 15*b* and the back face 14*a* of the flange 14 is an obtuse angle, it is difficult for the claws 44 to slide over the stopper face 15*a* and pass over the projection 15. That is to say, it is difficult for the claws 44 to bypass the projection 15. Accordingly, the present structure restricts the movement of the claws 44 in a more reliable manner, and restricts the wasteful rotation of the front cover 40 efficiently. This effect is also produced when the stopper face 15*a* faces the back face 14*a* of the flange 14 with an acute angle therebetween.

Also, in the present embodiment, as shown in FIG. 14B, width W1, which is a width of the projection 15 along the circumferential direction of the flange, is larger at a farther position from the lamp axis J, and is the largest at the farthest position from the lamp axis J. Accordingly, compared with the case where width W1 is smaller at a farther position from the lamp axis J, the case indicated by the two-dot chain line in FIG. 4B, it is difficult for the claw 44 to horizontally slide over the stopper face 15*a* and pass over the projection 15. That is to say, it is difficult for the claw 44 to bypass the sides of the projection 15 (sides that are away from the lamp axis J). Accordingly, the present structure restricts the movement of the claws 44 in a more reliable manner, and restricts the wasteful rotation of the front cover 40 efficiently.

The stopper face 15*a* preferably has a shape that enables the stopper face 15*a* to be in a face-to-face contact with the claw 44 when it bumps against the claw 44.

With the above engaging structure where the claws 44 engage with the flange 14, if the front cover 40 is rotated, the front cover 40 wastefully rotates until the claws 44 bump against the projections 15. That is to say, the front cover 40 is attached to the body 10 in the state where there is a certain play in the rotational direction around the lamp axis J. The presence of such a play eliminates the need to position the rotational direction of the claws 44 and the projections 15 around the lamp axis J, namely the need to position the rotational direction of the front cover 40 and the body 10 around the lamp axis J.

Note that such a play may not be necessary. One example of such cases is a structure where two projections 15 sandwich one claw 44 of the front cover without any space therebetween. With this structure, no wasteful rotation occurs before the claw 44 bumps against the projections 15 when the LED lamp 1 is attached to the lighting equipment and when the LED lamp 1 is detached from the lighting equipment.

[Modifications]

Up to now, a specific example of the light source apparatus of the present invention has been explained in the Embodiment. However, the light source apparatuses in the Embodiment is not limited to the example.

For example, the LED module is not limited to the module using LEDs, but may be a module using a semiconductor laser diode or an electroluminescence element. Also, the color of the light emitted from the LED module is not limited to white, but any color may be adopted.

Figure 7:
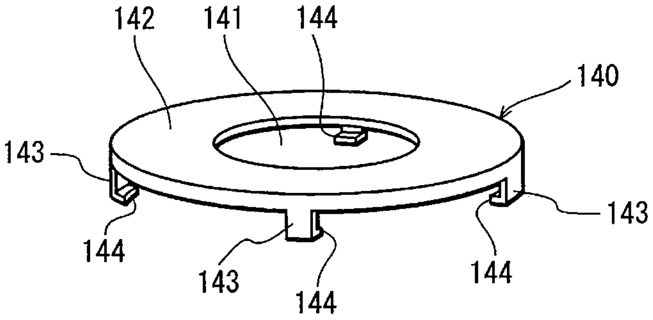
FIG. 7 is a perspective view of a front cover in a modification.
Figure 8:
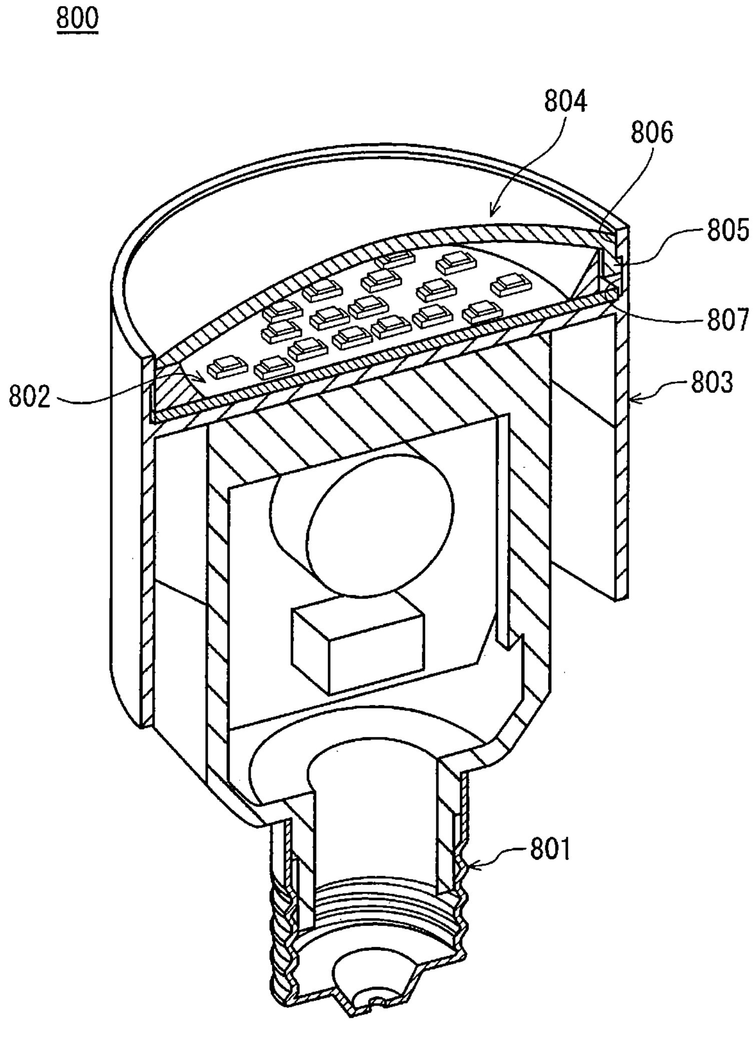
FIG. 8 is a sectional perspective view of a conventional light source apparatus.
Figure 9:
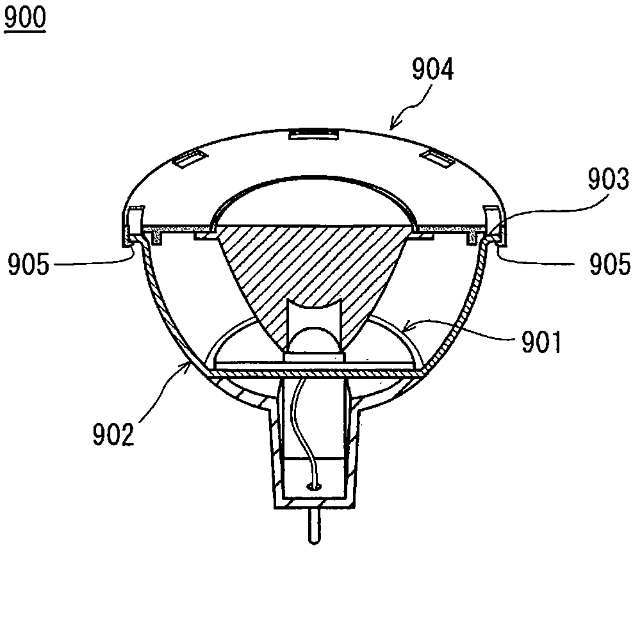
FIG. 9 is a sectional perspective view of a conventional light source apparatus.

Also, the front cover is not limited to the shape of the front cover 40 described in the Embodiment. FIG. 7 is a perspective view of a front cover in a modification. As shown in FIG. 7, in a front cover 140 in the modification, a plurality of circumferential walls 143 are formed at intervals along the circumference of the main body 142, which is different from the front cover 40 of the Embodiment in which the circumferential wall 43 is formed along the whole circumference of the main body 42.

The front cover 140 includes: a main body 142 that is in the shape of a ring-like plate and has an approximately circular light emission window 141; and a plurality of circumferential walls 143 that are each approximately in the shape of a belt and are provided at intervals along the circumferential direction of the main body 142. A claw 144 is provided at the edge of each circumferential wall 143. The claws 144 are caused to go around behind the flange 14 of the body 10, thereby causing the claws 144 to engage with the flange 14. Even if the front cover 140 is in such a shape, if the projections 15 are provided in the back face 14*a* of the flange 14 of the body 10, it is possible to restrict the wasteful rotation of the front cover 140 relative to the body 10.

INDUSTRIAL APPLICABILITY

The light source apparatus of the present invention can be extensively used for lighting in general.

REFERENCE SIGNS LIST

1 light source apparatus
10 body
10*a* opening-side end
11 opening
14 flange
14*a* back face
15 projection
15*a* stopper face
20 light-emitting module
40, 140 front cover
43, 143 circumferential wall
44, 144 claw

The invention claimed is:

1. A light source apparatus comprising:
a cylindrical body having an opening;
a light-emitting module housed in the body; and
a front cover attached to an opening-side end of the body,
a ring-like flange being provided at the opening-side end of the body, a plurality of claws being provided at a circumferential edge of the front cover, the front cover having been fitted to the opening-side end of the body, with the flange being covered by the circumferential edge of the front cover, and
at least one stopper face having been formed in the flange such that at least one of the claws being in contact with the at least one stopper face restricts the front cover from rotating around a cylindrical axis of the body.

2. The light source apparatus of claim 1, wherein
the flange is, at its back face, provided with at least one projection having the at least one stopper face, the back face of the flange being at least partially covered by the claws.

3. The light source apparatus of claim 2, wherein
the at least one stopper face of the at least one projection is perpendicular to the back face of the flange or faces the back face with an acute angle therebetween.

4. The light source apparatus of claim 3, wherein
a width of the at least one projection in a circumferential direction of the flange is the largest at the farthest position from the cylindrical axis of the body.

5. The light source apparatus of claim 2, wherein
a width of the at least one projection in a circumferential direction of the flange is the largest at the farthest position from the cylindrical axis of the body.

6. The light source apparatus of claim 1, wherein
the ring-like flange is provided with a pair of projections, each projection has at least one stopper face, one of the plurality of claws is positioned between the pair of projections with respective stopper faces positioned on adjacent opposite sides of the one of the plurality of claws to prevent rotation of the ring-like flange in either direction.

7. A light source apparatus comprising:
a light emitting module for providing an emission of light;
a body having an opening and mounting the light-emitting module operatively within the body, the body having a flange extending around and radially outward from the opening with a plurality of spiral projections (a) extending downward from the flange in a direction opposite from the opening and (b) radially inward to be adjacent an outer wall of the body; and a front cover configured to be detachably mounted to the body and to extend across the flange, with a circumferential wall configured to extend downward and to extend over the flange on the body, the front cover includes at least one claw extending radially inward from the circumferential wall, below the flange and between a pair of the spaced projections, the claw has a surface configuration to contact and be restrained from further movement by rotation because of contact with the spaced projections.

8. The light source apparatus of claim 7 further comprising an optical member to transmit light from the light-emitting module to form a spotlight, the optical member is captured by an opening in the front cover and held in place over the light-emitting module when the front cover is mounted on the body,

9. The light source apparatus of claim 7 wherein the flange on the body has a cavity extending downward from an upper surface of the flange above each spaced projection.

10. The light source apparatus of claim 7 wherein a plurality of spaced claws are provided extending radially inward from the circumferential wall.

11. The light source apparatus of claim 10 Wherein each claw is tapered across a face to facilitate mounting across and behind the body flange and the ends of the claw faces are configured to abut and prevent movement with the spaced projections on the body.

* * * * *